United States Patent [19]

Hall, II et al.

[11] Patent Number: 5,215,111

[45] Date of Patent: Jun. 1, 1993

[54] METHOD OF PERFORMANCE IMPROVEMENT FOR AN I/P SERVO

[75] Inventors: George R. Hall, II, Geneva; Raymond J. Dippert, Cleveland; Thomas E. Stevenson, Willoughby Hills; James M. Smith, Eastlake, all of Ohio

[73] Assignee: Elsag International B.V., Amsterdam Zuidoost, Netherlands

[21] Appl. No.: 969,119

[22] Filed: Oct. 30, 1992

[51] Int. Cl.⁵ .............................. G05D 16/20
[52] U.S. Cl. .................... 137/82; 137/83; 251/129.08; 251/129.11
[58] Field of Search ............. 137/82, 83; 251/129.08, 251/129.11, 301, 326

[56] References Cited

U.S. PATENT DOCUMENTS 3,633,604 1/1972 Klee ........................ 137/83
4,610,263 9/1986 Barnes ..................... 137/85

Primary Examiner—Alan Cohan
Attorney, Agent, or Firm—Michael M. Rickin; Eric Marich

[57] ABSTRACT

A pneumatic servo comprises a motor having a shaft for rotation in response to an electrical signal. A cam is connected to the shaft for rotation therewith. The cam has an outer profiled periphery and opposite sides. A pneumatic nozzle having an opening for directing a flow of gas toward one side of the cam near the periphery, obscures the flow by different amounts as the cam rotates to create a back pressure in the nozzle comprising a pneumatic signal. A curved projection engages an opposite side of the cam, the projection being aligned with the nozzle opening and reducing oscillation excursions of the servo at gas pressures in the nozzle of above 12 psi.

8 Claims, 2 Drawing Sheets

METHOD OF PERFORMANCE IMPROVEMENT FOR AN I/P SERVO

FIELD AND BACKGROUND OF THE INVENTION

The present invention relates in general to pneumatic controllers, and in particular to a new and useful servo which has reduced susceptibility to oscillations.

U.S. Pat. No. 4,610,263, the disclosure of which is incorporated herein by reference, discloses a pneumatic servo assembly which utilizes a motor driven cam that moves in front of a pneumatic nozzle to cause a back pressure in the nozzle which is conveyed to a bellows as a pneumatic signal. The pneumatic signal is converted to an electrical signal and causes rotation of the cam to equalize the setting of the servo.

I/P positioners, such as the Type AP7 positioner available from Bailey Controls Company, are known which utilize similar servos. Servos, as described herein, are current-to-pneumatic converters that generally convert an electrical signal of 4 to 20 mA to a pressure signal of 3 to 15 psig.

FIG. 1 illustrates a servo of the prior art which comprises a motor 10 having a shaft with hub 12 which drives a cam 14. The outer periphery of cam 14 is profiled so that as hub 12 rotates, the outlet opening of a nozzle 16 is either fully covered, fully exposed or partially covered, to produce a back pressure in an air hose 18 connected to the nozzle. A nozzle support or bracket 20 having a bore therethrough for receiving nozzle 16, holds the nozzle in a fixed position with a set or lock screw 22. Bracket 20 includes a flange 24 with an upper surface that backs up the cam 14. Flange 24 is positioned below nozzle 16 with cam 14 sliding between the nozzle and the flange. Flange 24 includes an air exhaust hole 26 which cooperates with air leaving nozzle 16 and the cross-sectional area of cam 14 covering the nozzle, to accurately produce a back pressure signal in hose 18.

As shown in FIG. 1, electrical signals can be provided over a pair of electrical lines 28 to motor 10 to rotate hub 12 and cam 14. As a result of its rotation, cam 14 in turn presents a different portion of its profiled outer periphery to the nozzle opening of nozzle 16, to change the pneumatic signal in the form of back pressure in the hose 18.

It has been found that servos of the design shown on FIG. 1, are not always stable above 12 psi. It has been found that such servos oscillate with excursions of 0.7% to 0.8% at constant input to the servo.

SUMMARY OF THE INVENTION

An object of the present invention is to provide a servo which reduces oscillation excursions at nozzle pressures above 12 psi to no more than 0.25%.

Accordingly, an object of the present invention is to provide a pneumatic servo comprising: a motor having a shaft for rotation in response to an electrical signal; a cam connected to the shaft for rotation therewith, the cam having an outer profiled periphery and opposite sides; a pneumatic nozzle having an opening for directing a flow of gas toward one side of the cam near the periphery, the flow through the opening being obscured by different amounts as the cam rotates to create a back pressure in the nozzle comprising a pneumatic signal; and a curved projection engaging an opposite side of the cam, the projection being aligned with the nozzle opening and reducing oscillation excursions of the servo at gas pressures in the nozzle of above about 12 psi.

A further object of the present invention is to provide a pneumatic servo which is resistant to oscillation excursions and which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
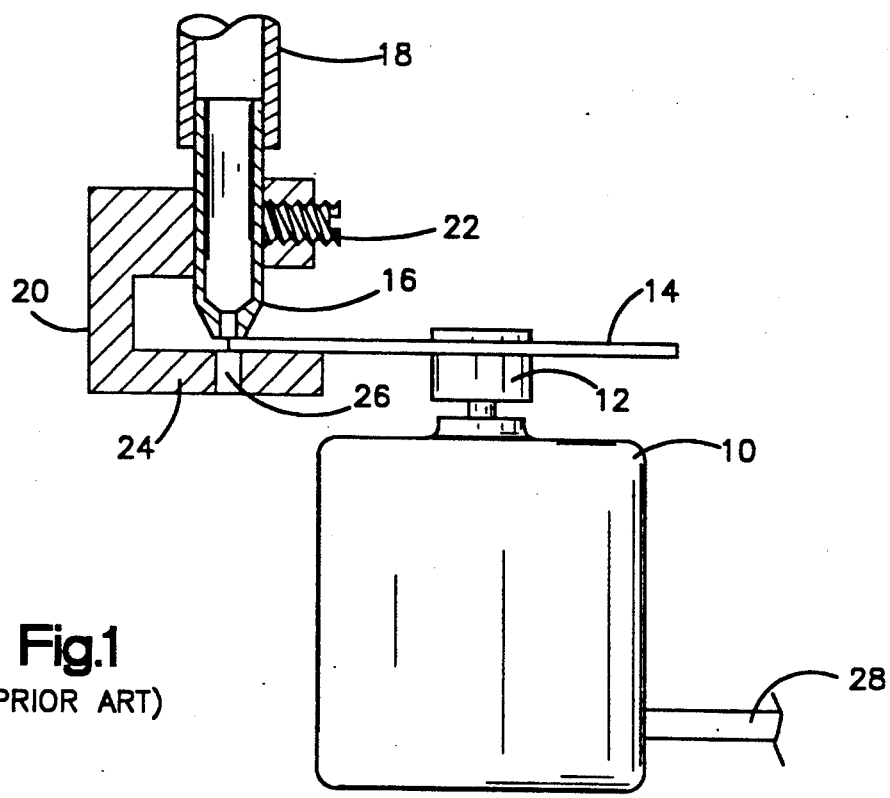
FIG. 1 is a schematic partial and sectional view of a servo according to the prior art.
Figure 2:
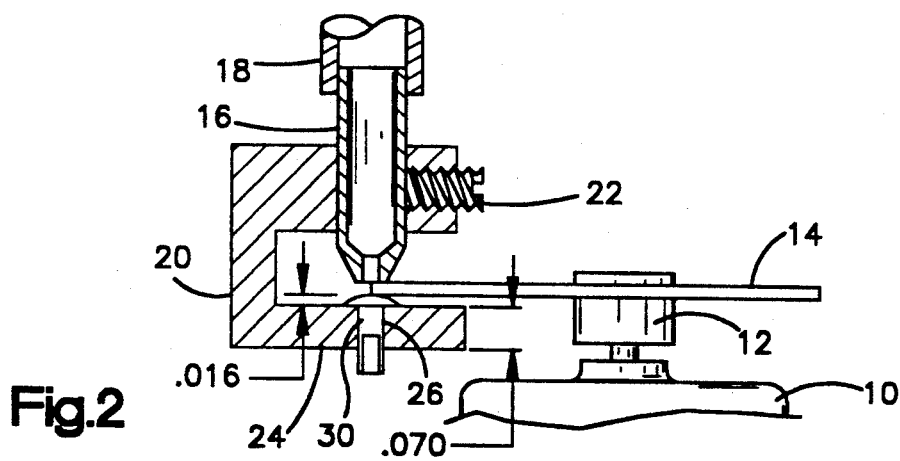
FIG. 2 is a view similar to FIG. 1 of a servo constructed according to the present invention.
Figure 3:
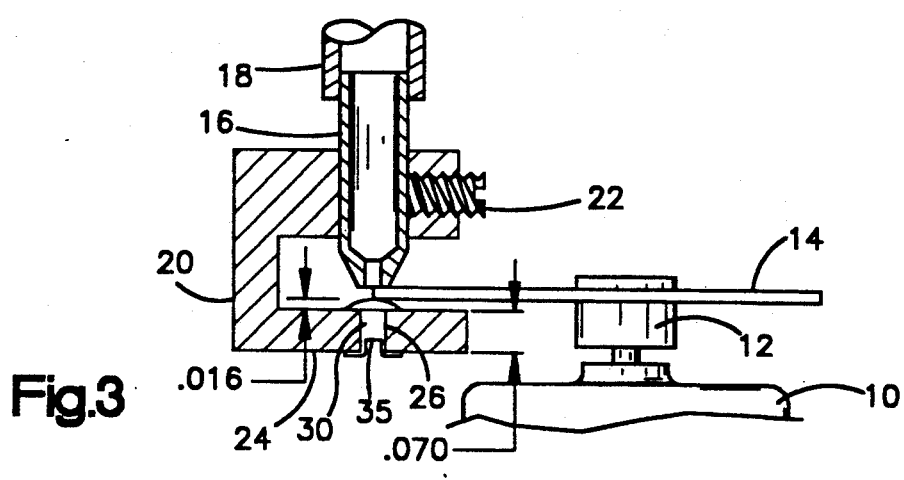
FIG. 3 is a view similar to FIG. 2 showing how a rivet used in accordance with the invention is fixed.
Figure 4:
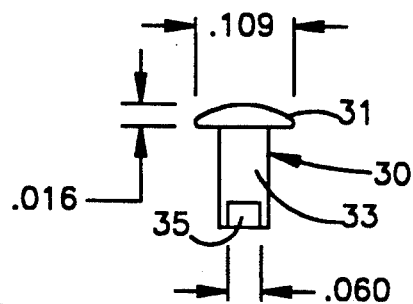
FIG. 4 is a side elevational view of a rivet used according to the present invention.

Referring now to FIGS. 2 and 3 where the same reference numerals as in FIG. 1 are utilized to designate the same or functionally similar parts, the present invention includes a rivet 30 in bore 26 which has a curved, for example spherical head 31 shown on FIG. 4, a shaft 33 extending through bore 26 and a blind bore 35 which, as shown in FIG. 3, can be flared to anchor the rivet in flange 24. An adhesive may be used to secure rivet 30 in bore 26.

The elevation of the curved surface of rivet 30 above the upper surface of flange 26 is advantageously 0.016 inches. The flange 24 may have a thickness of 0.070 inches.

As shown on FIG. 4, the rivet head 31 may have an outer diameter of 0.109 inches and a diameter of shaft 33 of 0.060 inches.

Tests conducted with nine (9) servos as shown in FIGS. 2 and 3 and two additional Type AP7 servos were conducted. Typical oscillation excursions and worst case excursion with the rivet in place for the nine servos and the two Type AP7 units are shown in the following table. The table also shows the worst case excursions for the two Type AP7 servos without the rivet in place. Gas flow is within 1% of 15 psi and all values are in percent.

| | WITH RIVET | | WITHOUT RIVET |
| | TYPICAL | WORST | WORST |
| SERVO | EXCURSION | EXCURSION | EXCURSION |
|---|---|---|---|
| A | 0.25 | 0.250 | |
| B | 0.200 | 0.250 | |
| C | 0.150 | 0.200 | |
| D | 0.050 | 0.200 | |
| E | 0.250 | 0.250 | |

-continued

| SERVO | WITH RIVET | | WITHOUT RIVET |
|---|---|---|---|
| | TYPICAL EXCURSION | WORST EXCURSION | WORST EXCURSION |
| F | 0.100 | 0.150 | |
| G | 0.125 | 0.150 | |
| H | 0.150 | 0.200 | |
| I | 0.050 | 0.100 | |
| AP7-1 | 0.150 | 0.200 | 0.7 |
| AP7-2 | 0.100 | 0.150 | 0.8 |

Figure 5:
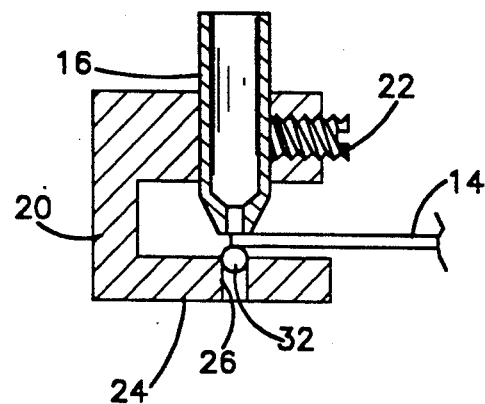
FIG. 5 is a partial view similar to FIG. 2 showing an alternate embodiment of the invention.
Figure 6:
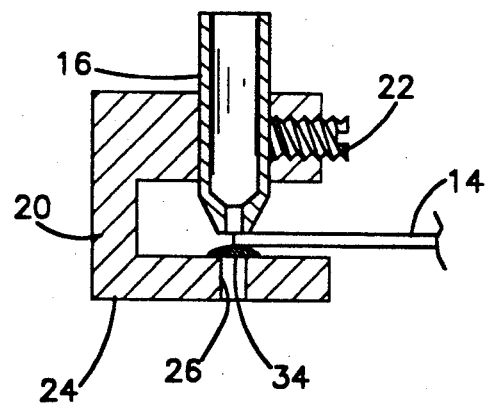
FIG. 6 is a view similar to FIG. 5 of a still further alternate embodiment of the invention.
Figure 7:
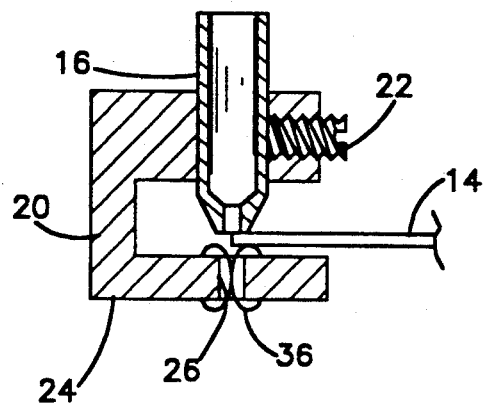
FIG. 7 is a view similar to FIG. 5 of a still further embodiment of the invention.

Instead of rivet 30, alternate curved surfaces can be used for engagement against the opposite side of cam 14 as shown in FIGS. 5-7.

In FIG. 5, a ball-bearing 32 is fixed over the bore in flange 24 to achieve the same effect.

In FIG. 6, the material of the flange 24 may be profiled or a slippery material such as TEFLON (a trademark) 34 can be used on the upper surface of flange 24.

In FIG. 7, an eyelet 36 has been fixed in the bore of flange 34 to achieve the same purpose.

While generally a full closing of the bore 26 in the flange 24 is desired, the example of FIG. 7 shows an open eyelet which has a curved upper surface that can also achieve reductions in oscillation excursions.

Returning to FIG. 2, nozzle 16 may advantageously be number 303 stainless steel with support or bracket 20 being aluminum chromate. The cam is synthetic resin material, for example, polycarbonate having 0.010 inches thickness or polyester having a thickness 0.007 inches.

While motor 10 is shown connected directly to shaft or hub 12, a 32:1 gearbox is preferably included between the motor proper and the shaft.

Rivet 30 is also advantageously stainless steel, for example, 430 stainless steel.

While a specific embodiment of the invention has been shown and described in detail to illustrate the application of the principles of the invention, it will be understood that the invention may be embodied otherwise without departing from such principles.

What is claimed is:

1. A pneumatic servo comprising:
   a motor having a shaft for rotation in response to an electrical signal;
   a cam connected to the shaft for rotation therewith, the cam having an outer profiled periphery and opposite sides;
   a pneumatic nozzle having an opening for directing a flow of gas toward one side of the cam, near the periphery, the flow being obscured by different amounts as the cam rotates to create a back pressure in the nozzle comprising a pneumatic signal; and
   a curved projection engaged on an opposite side of the cam, the projection being aligned with the nozzle opening and reducing oscillation excursions of the servo at gas pressures in the nozzle of above about 12 psi.

2. A servo according to claim 1, wherein the curved projection is closed.

3. A servo according to claim 2, including a bracket for holding the nozzle and having a flange spaced from the nozzle, the flange having a bore therethrough, the projection comprising a rivet fixed in the bore and having a curved closed head engaged with the cam.

4. A servo according to claim 1, including a bracket for supporting the nozzle, the bracket having a flange with a bore therethrough, the projection extending over the bore.

5. A servo according to claim 4, wherein the projection comprises a ball-bearing over the bore.

6. A servo according to claim 4, wherein the projection comprises a projection of slippery material over the bore.

7. A servo according to claim 4, wherein the projection is formed by an eyelet fixed in the bore.

8. A servo according to claim 4, wherein the flange has a surface facing the cam, the projection being formed on the surface.

* * * * *